United States Patent [19]

Chen et al.

[11] Patent Number: 4,474,583

[45] Date of Patent: Oct. 2, 1984

[54] PROCESS FOR GASIFYING SOLID CARBONACEOUS FUELS

[75] Inventors: Chia-Wei Chen, Short Hills; Leonard W. Zahnstecher, Livingston; William J. Maier, Jr., Clifton, all of N.J.

[73] Assignee: Foster Wheeler Energy Corporation, Livingston, N.J.

[21] Appl. No.: 387,583

[22] Filed: Jun. 11, 1982

[51] Int. Cl.³ .............................. C10J 3/46; C10J 3/54
[52] U.S. Cl. .................................. 48/197 R; 48/206; 48/210
[58] Field of Search ............. 48/202, 206, 210, 197 R, 48/68

[56] References Cited

U.S. PATENT DOCUMENTS

| | | | |
|---|---|---|---|
| 2,143,017 | 1/1939 | Koppers | 48/68 |
| 2,591,595 | 4/1952 | Ogorzaly | 48/210 |
| 3,957,459 | 5/1976 | Mitchell et al. | 48/202 |
| 3,971,636 | 7/1976 | Matthews | 48/202 |
| 4,099,933 | 7/1978 | Johnson | 48/202 |
| 4,135,893 | 1/1979 | Roberts | 48/202 |
| 4,349,354 | 9/1982 | Flesch | 48/67 |

FOREIGN PATENT DOCUMENTS

| | | | |
|---|---|---|---|
| 3028067 | 4/1981 | Fed. Rep. of Germany | 48/210 |
| 2086411 | 5/1982 | United Kingdom | 48/206 |

Primary Examiner—Peter F. Kratz
Attorney, Agent, or Firm—Marvin A. Naigur; John E. Wilson; Martin Smollowitz

[57] ABSTRACT

A heat recovery process for use in gasification of solid carbonaceous fuel such as coal utilizing a fluidized bed of char. The vapor and entrained char dusts rise from a gasification section into a gas solids disengaging section and into a heat recovery section, from which a major portion of the char solids are returned to the gasification section. The vapor and some retaining fine solids pass upwardly into the cooling section containing a fluidized bed of char particles maintained at a temperature of about 800°–1500° F. by a cooling fluid to solidify sticky ash on the char particles. The char containing the sticky ash is then returned to the lower gasification section for reheating and further gasification reactions. The remaining fine solids are separated from vapors and returned to the lower fluidized beds, and a clean product gas stream is withdrawn.

15 Claims, 2 Drawing Figures

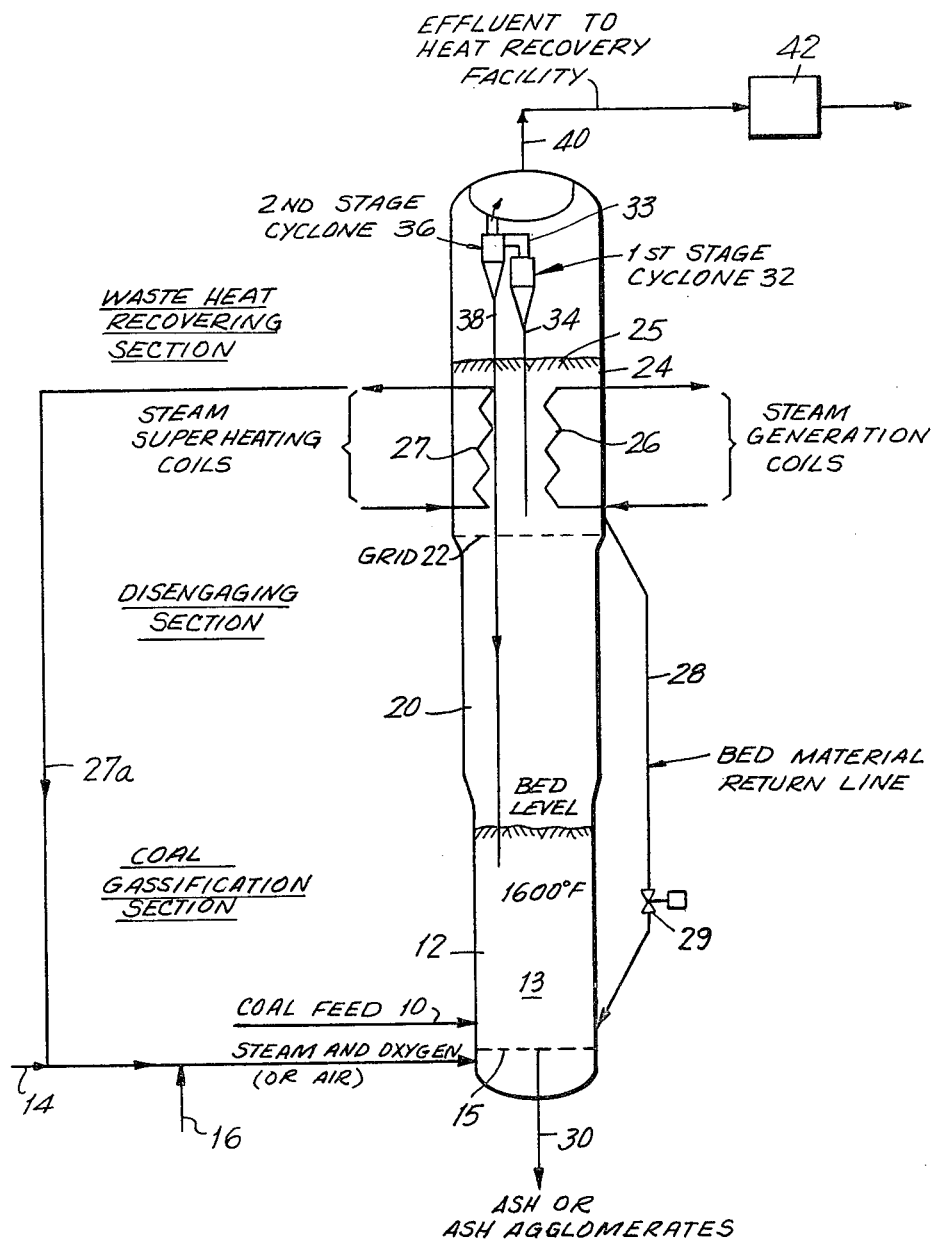

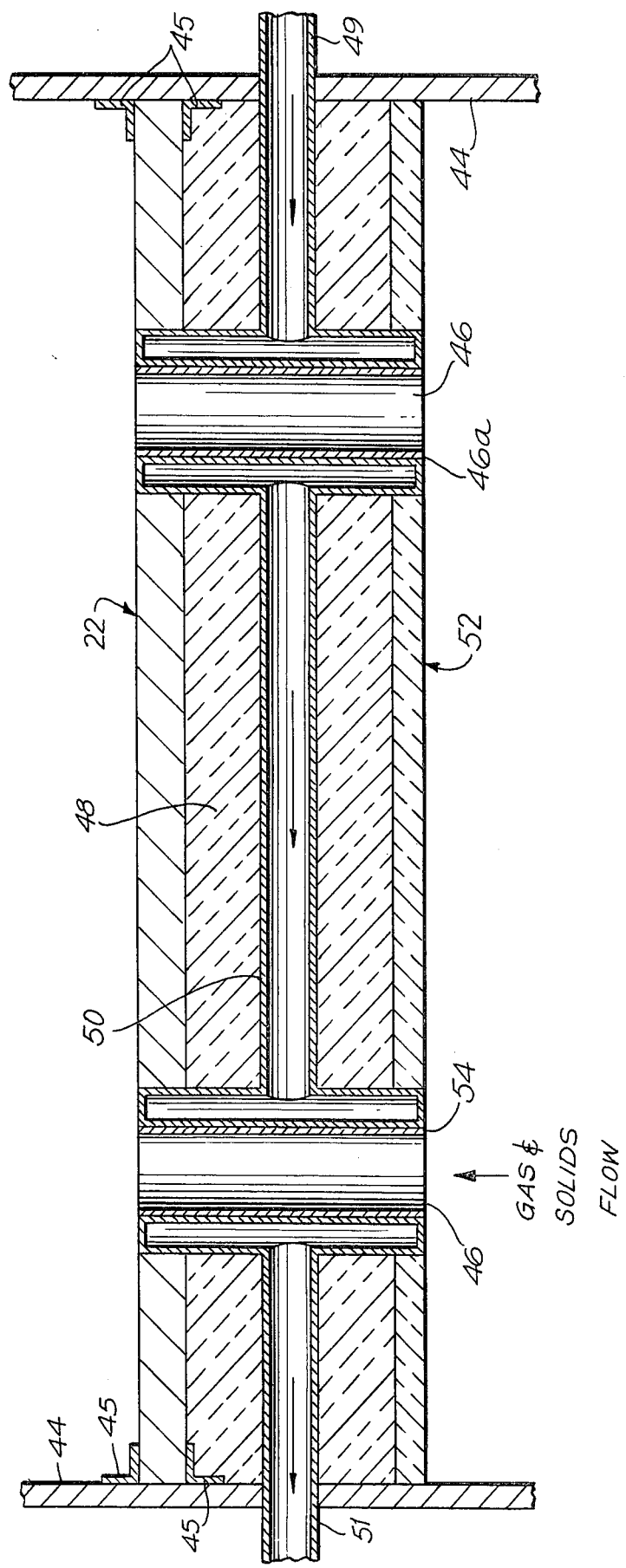

PROCESS FOR GASIFYING SOLID CARBONACEOUS FUELS

BACKGROUND OF INVENTION

This invention pertains to an improved process for heat recovery in gasifying solid carbonaceous fuels such as coal to provide a clean gaseous fuel product. It pertains particularly to such gasification process using a lower fluidized bed for devolatilization and combustion of a coal feed and an upper fluidized bed for recovery of heat from gasifier effluent, with the beds separated by an intermediate gas-solids disengaging section.

For high temperature fluidized or entrained bed type coal gasifiers operating at 1500° F. and higher outlet temperatures, the dust carried off from the gasifier usually contains sticky particles which will deposit on surfaces within dust recovery cyclone separators and other downstream equipment and seriously interfere with their operation. The sticky particles are primarily due to the iron sulfide and/or oxide complex compounds from the ash portion of the char fines. Low melting point eutectic compounds from vanadium, sodium, potassium, calcium and others may also form sticky particles on the equipment. The U.S. eastern high sulfur bituminous coals are particularly prone to such ash deposit problems. The prior art discloses that overcoming this problem is accomplished either by quenching the gasifier effluent before it leaves the unit, or by contacting the effluent in a cold wall equipment to solidify the sticky ash. However, these methods have the disadvantage in that a large portion of the high level heat is undesirably lost. For example, in quenching the effluent from 1850° F. to 1500° F. approximately 25% of the high level heat is lost in vaporizing the quench water.

Also in a gasifier that is subject to gasifier effluent load variations, the design of the waste heat recovery system can be complicated. The heat recovery system surfaces, such as shell and tube heat exchangers, must be arranged in such a manner between steam generation and steam superheating to permit adequate flexibility. The invention described herein overcomes these problems.

The gasification of coal using a lower fluidized bed gasification zone and a superposed fluidized bed cooling zone is generally disclosed by U.S. Pat. No. 2,591,595 to Ogorzaly. Also, U.S. Pat. No. 4,099,933 to Johnson et al. discloses the gasification of coal using multiple superposed zones maintained at desired temperature ranges to control the coal heating rate, particularly for caking type coals. However, further improvements in coal gasification are desired, particularly to eliminate sticky particles in the product gas and to provide for more efficient heat recovery.

SUMMARY OF INVENTION

The present invention provides an improved process for recovering heat from the effluent gas from the gasification of solid carbanaceous fuels, such as coal, to provide a clean fuel gas product. In the process, the carbonaceous material in particulate form is fed with an oxygen-containing gas and steam into a gasifier lower section containing a bed of hot fuel and char particles. In this bed, which is maintained at temperature within a range of about 1500° F.-2000° F., the feed is rapidly heated, devolatilized and gasified to produce gases and char particles. Ash and agglomerates are withdrawn from the lower end of the gasification section as needed to prevent excessive accumulation. The solid carbonaceous feed can include, but is not limited to coal, including: anthracite, bituminous, and sub-bituminous type coal, coke from coal or petroleum, and bitumen from tar sands.

In this invention, the gasified effluent from the coal gasification section at a temperature of 1500° F-2000° F. rises to an adjacent gas-solids disengaging section. In this disengaging section, the entrained char dusts are separated from the gases and a major portion of the solids are returned by gravity settling to the gasifier section for further reaction. The size or diameter and height of the disengaging section is made sufficient to meet a permissible dust loss to the waste heat recovery section.

The gasifier effluent from the disengaging section comprising gases and some fine char solids is passed upwardly through openings in a refractory-lined grid plate to a waste heat recovery section. The grid plate is lined on the lower side facing the high temperature disengaging section with a cooled refractory material to provide for heat and erosion protection. The grid openings are also cooled to avoid deposits of sticky ash particles therein. The fluid or medium used for such cooling can be either boiler feed water for steam generation, condensate or other suitable material. The waste heat recovery section contains a fluidized bed of fine char particles and is provided with cooling surfaces in the bed, such as flow passages for a cooling fluid such as water for steam generation and superheating. The fluidized bed material in this heat recovery section can be entrained dusts from the disengaging section, the particulate material from the fluidized bed coal gasification section, or other suitable materials that have good fluidization and heat transfer characteristics.

The operating temperature of the waste heat recovery section of the gasifier is regulated and maintained in a desired range such as 800°-1500° F. by the amount of cooling provided by the circulating cooling fluid such as water for steam generation and superheating obtained in the fluidized bed. The gas exit temperature from the waste heat recovery section effluent is thus controlled to avoid deposit of sticky particles on the inner surfaces of the cyclone separators and other downstream equipment, and thus avoid an accumulation of deposits and possible plugging of such equipment. The operating temperature of the upper fluidized bed cooling section is thereby maintained below the solidification temperature of the char ash.

For a coal gasifier having varying gas flow or loads, the waste heat recovery section is equipped with multiple steam generation and superheating surfaces or coils for heat recovery from the effluent gas. The operation and allocation of the steam generating and superheating coil surfaces is arranged to yield an optimum gas temperature for the waste heat recovery section exit gas. For such a coal gasifier having varying gas flow loads, methods which can be used for controlling the required heat recovery section include:

(a) controlling the fluidized bed height in the upper section to vary the height of cooling fluid passages submerged in the fluidized bed;

(b) by-passing a section of the cooling fluid passage(s) that is not in use;

(c) varying the flow rate of the cooling medium through the superheater coils;

(d) varying the operating pressure in the steam generation and superheating passages; and
(e) re-allocating of steam generation and superheating passages as desired.

Due to the entrained char dust particles entering the waste heat recovery section, excess dust is returned at a controlled rate through a conduit to the lower gasification section for further gasification reaction, so as to maintain a bed level in the heat recovery section covering the steam generation and superheating coils to the extent desired.

Effluent gas which is substantially free of sticky particles is then passed from the heat recovery section through a two-stage cyclone separator arrangement for substantial removal of fine char solids from the gas. Fines from both the first stage and second stage cyclone separators are usually returned to the upper bed; however, it is usually advantageous and preferred to return the char fines from the second stage separator directly to the gasification section for achieving increased overall conversion of carbon in the feed. The clean effluent gas from the second cyclone separation step can be forwarded to an additional conventional heat recovery and gas purification step or facility as desired.

This invention provides several advantages and benefits, including: excellent heat recovery from the gasifier effluent, high gasifier efficiency and usage of converting equipment such as cooled refractory-lined grid plate, cyclones and heat exchangers at a moderate temperature of 800°–1500° F. instead of the usual 1500° F.–2000° F. The fluidized bed heat removal and recovery process of the invention can be adapted for use with various types of gasifiers for solid carbonaceous fuels, including: fluidized bed, entrained bed and slagging bed type gasifiers. The gasifiers can be either incorporated with the heat recovery section in a single vessel, or provided as a separate stand-alone unit located adjacent and below the heat recovery section with or without using a lower gas-solids disengaging section.

BRIEF DESCRIPTION OF DRAWINGS

FIG. 1 is a schematic diagram of a coal gasifier having a lower gasification section, an intermediate gas solids disengaging section, and an upper heat recovery section for providing a gaseous product.

FIG. 2 is a vertical cross-sectional view of a refractory-lined grid used for supporting the heat recovery fluidized bed.

DESCRIPTION OF PREFERRED EMBODIMENT

As shown in FIG. 1, coal which is ground to a suitable particle size is provided at 10 and fed into the lower portion of gasification section 12 containing a fluidized bed 13 of hot coal and char particles. Steam at 14 and oxygen-containing gas at 16 are also introduced into the gasification section or zone 12 through a flow distributor 15, so that bed 13 is maintained at temperature within a range of 1500°–2000° F. principally by the exothermic reactions which occur therein. Useful gasification pressures are within a range of 50–500 psig.

The resulting vapors along with some entrained char solids are passed from the gasification section 12 upwardly to an adjacent gas-solids disengaging section 20. In this section or zone, which has an increased diameter relative to the gasification section, the superficial upward gas velocity is reduced sufficiently to allow a major portion of the char solids to disengage from the up-flowing gas and descend by gravity to the fluidized bed 13 for futher gasification reactions therein. Useful upward gas superficial velocity in the disengaging section is within a range of 1–4 ft./sec.

The effluent material from the disengaging section 20 containing gases and some remaining fine char solids is passed on upwardly through substantially flat refractory-lined grid plate 22 into a cooling section 24 containing fluidized bed 25 of fine char particles for recovery of waste heat from the gas. This heat recovery section preferably has a diameter larger than the disengaging section 20 and is provided with heat transfer passages 26 and 27 carrying a cooling fluid such as water to generate steam at 26 and to superheat the steam at 27. These cooling surfaces serve to maintain the temperature of fluidized bed 25 within a desired range such as 800°–1500° F. and to solidify the sticky ash on the fine char solids therein and to prevent entry of sticky ash into downstream process equipment. If desired, at least a portion 27a of the steam generated in passages 26 and 27 can be used to provide steam at 14.

A portion of the fine char solids containing sticky ash are returned at a controlled rate from bed 25 through conduit 28 and control valve 29 to the lower gasification zone 12. Here the solids are reheated and further gasified to produce additional gas products. Following gasification, the remaining ash agglomerates from both the coal gasification bed 13 and heat recovery bed 25 are withdrawn at 30 as needed from the bottom of the gasification bed above the flow distributor grid 15.

From heat recovery section 24, the effluent gas which is substantially free of sticky ash particles is passed to first stage or primary cyclone solids separator 32, from which fine char solids are returned through conduit 34 to fluidized bed 25. The gas portion from cyclone 32 is passed at 33 to second state cyclone separator 36, from which the remaining fine char solids are preferably returned at 38 to lower gasification bed 13 in gasification section 12. The resulting clean gas product is withdrawn at 40, and can be further cooled and treated in conventional equipment 42 to remove acid gases and sulfur compounds.

Although FIG. 1 shows one useful modern ash agglomerating fluidized bed type gasifier, it should be noted that the solids disengaging and heat recovery system of this invention will work equally well with other types of gasifiers, such as: entrained bed units, slagging bed type gasifiers and others where the gas effluent contains sticky ash particles. For all such gasifiers, the ground and sized coal, steam and oxygen-containing gas, are fed into the lower section of the gasifier. Various types of gasifiers may utilize specific feeding systems for the coal feed and gas reactants. To yield a good quality agglomerate material, rich in ash, the gasifier section usually operates at 1500°–2000° F. temperature, principally by the exothermic reactions which occur therein.

The refractory-lined grid 22 supporting heat recovery fluidized bed 25 is shown in greater detail in FIG. 2. The grid plate 22 is made of heat resistant metal and is supportably attached to walls 44 of the gasifier such as by brackets 45. Plate 22 contains a plurality of openings 46, through which gas and solids pass upwardly into fluidized bed 25. Plate 22 is thermally protected by refractory layer 48, which is cooled by a fluid, such as, pressurized water provided at 49 and flowing through passages 50 and out via outlet passage 51. This fluid also serves to cool the walls 46a of grid openings 46. Also, a layer of dense refractory material is provided at 52, for protecting the grid plate structure 22 from erosion by the upflowing char particles. If desired, the wall openings 46 can also be lined with a hard refractory material 54, to prevent erosion of the water cooled walls. Grid openings 46 usually have a diameter of 1–6 inches and are preferably 1.5–3.0 inches in diameter.

Although this invention has been broadly disclosed by the accompanying drawings and a preferred embodiment, it is recognized that various equivalent modifications can be made thereto all within the spirit and scope of the invention, which is defined by the following claims.

We claim:

1. A heat recovery process for use in gasification of solid carbonaceous fuel to produce clean gas product, comprising:
    (a) feeding solid particulate fuel into a lower gasification section containing a bed of hot char particles together with steam and oxygen to maintain the bed temperature within a range of about 1500°–2000° F. and gasifying the feed;
    (b) passing hot gas and entrained char particles produced in the gasification section upwardly into a gas-solids disengaging section in which the upward superficial gas velocity is less than in said gasification section, and from which disengagement section a major portion of the particulates are returned by gravity to the gasification section;
    (c) passing hot gas and the remaining char particles from said disengaging section upwardly through a plurality of openings in a substantially flat cooled grid into a heat recovery section containing a fluidized bed of fine char particles maintained at a temperature of about 800°–1500° F., wherein the hot gas is cooled and sticky ash particles contained therein are solidified on the char in the fluidized bed to substantially prevent sticky materials in the effluent gas, said grid being cooled internally by supplying cooling fluid through a passage therein;
    (d) returning char solids containing the sticky ash materials from the upper heat recovery section fluidized bed to the gasification section for further reaction; and
    (e) passing effluent gas from the heat recovery section through a solids separation step, returning fine char solids from the separation step to the lower gasification section, and withdrawing a clean hydrocarbon gas product stream.

2. The process of claim 1, wherein the superficial gas velocity in said disengagement section is within a range of 1 to 4 ft/sec.

3. The process of claim 1, wherein the temperature in the heat recovery fluidized bed is maintained within a range of about 800°–1500° F. by a circulating cooling fluid.

4. The process of claim 1, wherein fine char solids containing sticky ash from the upper heat recovery bed are returned to the gasification section at a rate sufficient to maintain a desired solids level in the upper bed.

5. The process of claim 1, wherein fine solids are removed from the effluent gas from the heat recovery bed by two stage cyclone separation, and fine char solids from the second stage cyclone separation are returned to the gasification section.

6. The process of claim 1, wherein the heat removal from the upper fludized bed is regulated to meet the gaseous product flow variation from the gasifier.

7. The process of claim 1, wherein the walls of the openings in said grid and the grid plate are water cooled to prevent sticky ash deposits therein.

8. The process of claim 1, wherein said solid carbonaceous fuel is coal.

9. The process of claim 1, wherein the gasification section comprises a fluidized bed type gasifier.

10. The process of claim 1, wherein the gasification section comprises an entrained bed type gasifier.

11. The process of claim 1, wherein said gas-solids disengaging section has a smaller diameter than the waste heat recovery section and has a larger diameter than said gasification section.

12. The process of claim 1, wherein ash agglomerates are withdrawn from the lower end of the gasification section.

13. The process of claim 1, wherein the gasifier section is provided as a separate vessel located adjacent said heat recovery section.

14. The process of claim 1, wherein ash slag is withdrawn from the lower end of the gasification section.

15. A heat recovery process used in gasification of coal to produce clean hydrocarbon gas product, comprising:
    (a) feeding particulate coal into a lower gasification section containing a fluidized bed of hot coal and char particles together with steam and oxygen to maintain the bed temperature within a range of about 1500°–2000° F. and gasifying the coal feed;
    (b) passing hot gas and entrained char particles produced in the gasification section upwardly at a reduced velocity of 1–4 ft./sec. into a gas-solids disengaging section, from which a major portion of the coal solids are returned by gravity to the gasification section;
    (c) passing hot gas and the remaining char particles from said disengaging section upwardly through a plurality of openings in a substantially flat water cooled grid into a heat recovery section containing a fluidized bed of fine char particles maintained at a temperature of about 800°–1500° F., wherein the hot gas is cooled and sticky ash particles contained therein are solidified on the char in the fluidized bed to prevent sticky materials in the effluent gas, said grid being cooled internally by supplying cooling water through a passage therein;
    (d) returning char particles containing the sticky ash materials from the upper heat recovery section fluidized bed to the coal gasification section for further reaction;
    (e) withdrawing ash agglomerates from the bottom of said gasification bed; and
    (f) passing effluent gas from the heat recovery section through two-stage cyclone solids separation steps, returning fine char particles from the second stage cyclone separation directly to the lower gasification section, and withdrawing a clean hydrocarbon gas product stream.

* * * * *